United States Patent
Kulkarni

(10) Patent No.: US 9,419,908 B2
(45) Date of Patent: Aug. 16, 2016

(54) NETWORK CONGESTION MANAGEMENT USING FLOW REBALANCING

(71) Applicant: Cisco Technology Inc., San Jose, CA (US)

(72) Inventor: Ajay Ashok Kulkarni, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 155 days.

(21) Appl. No.: 14/091,720

(22) Filed: Nov. 27, 2013

(65) Prior Publication Data

US 2015/0146526 A1   May 28, 2015

(51) Int. Cl.
*H04L 12/807* (2013.01)
*H04L 12/803* (2013.01)
*H04L 12/801* (2013.01)

(52) U.S. Cl.
CPC ............. *H04L 47/27* (2013.01); *H04L 47/11* (2013.01); *H04L 47/122* (2013.01); *H04L 47/125* (2013.01)

(58) Field of Classification Search
None
See application file for complete search history.

(56) References Cited

U.S. PATENT DOCUMENTS

| 8,027,354 | B1 | 9/2011 | Portolani et al. | |
|---|---|---|---|---|
| 2010/0306408 | A1* | 12/2010 | Greenberg et al. | 709/238 |
| 2011/0211449 | A1 | 9/2011 | Attar et al. | |
| 2012/0106347 | A1* | 5/2012 | Allan et al. | 370/238 |
| 2013/0182567 | A1 | 7/2013 | Scheffenegger | |
| 2014/0164640 | A1* | 6/2014 | Ye et al. | 709/235 |

OTHER PUBLICATIONS

Mohammad Alizadeh, et al., "Data Center TCP (DCTP)," SIGCOMM 2010, 12 pages; http://www.stanford.edu/~alizade/Site/DCTCP_files/dctcp-final.pdf.
Jitendra Padhye, et al., "Modeling TCP Throughput: A Simple Model and its Empirical Validation," SIGCOMM 1998, 12 pages; ftp://gaia.cs.umass.edu/pub/Padhye-Firoiu98-TCP-throughput.ps.
Y. Chen, et al. "Understanding TCP Incast Throughput Collapse in Datacenter Networks," WREN 2009, 10 pages; http://www.eecs.berkeley.edu/~ychen2/professional/TCPIncastWREN2009.pdf.

* cited by examiner

*Primary Examiner* — Awet Haile
*Assistant Examiner* — Kent Krueger

(57) ABSTRACT

Systems and methods are disclosed for managing congestion in a data network. In a data network, various data flows are transmitted between source and destination nodes. One or more computing devices of the network may be configured to detecting congestion in a first path and provide an indication of the congestion, directly or indirectly, to a destination device. A switch associated with the path is designated for performing rebalancing of the flow based at least in part on a control message generated in response to an instruction received, either directly or indirectly, from a source device. Reassignment of the congested flow to a new path can help alleviate congestion and improve network performance.

20 Claims, 5 Drawing Sheets

NETWORK CONGESTION MANAGEMENT USING FLOW REBALANCING

TECHNICAL FIELD

The present description relates generally to congestion management in computer networks.

BACKGROUND

In computer networks, network congestion can occur when a node of the network (e.g., a switch) sends an excess amount of data such that its quality of service deteriorates. Effects of network congestion can include queuing delays, packet loss or the blocking of new connections. Due to such effects, incremental increases in offered load can lead either only to small increases in network throughput, or to an actual reduction in network throughput.

Various congestion control and/or avoidance mechanisms may be implemented as an attempt to at least partially alleviate the effects of network congestion. For example, Explicit Congestion Notification (ECN) may be implemented in TCP-based systems, such as certain data centers, wherein congestion feedback prompts a sender device to reduce its transmission window. However, window reduction can present various drawbacks, such as a reduction in sender transmission bandwidth.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

Figure 1:
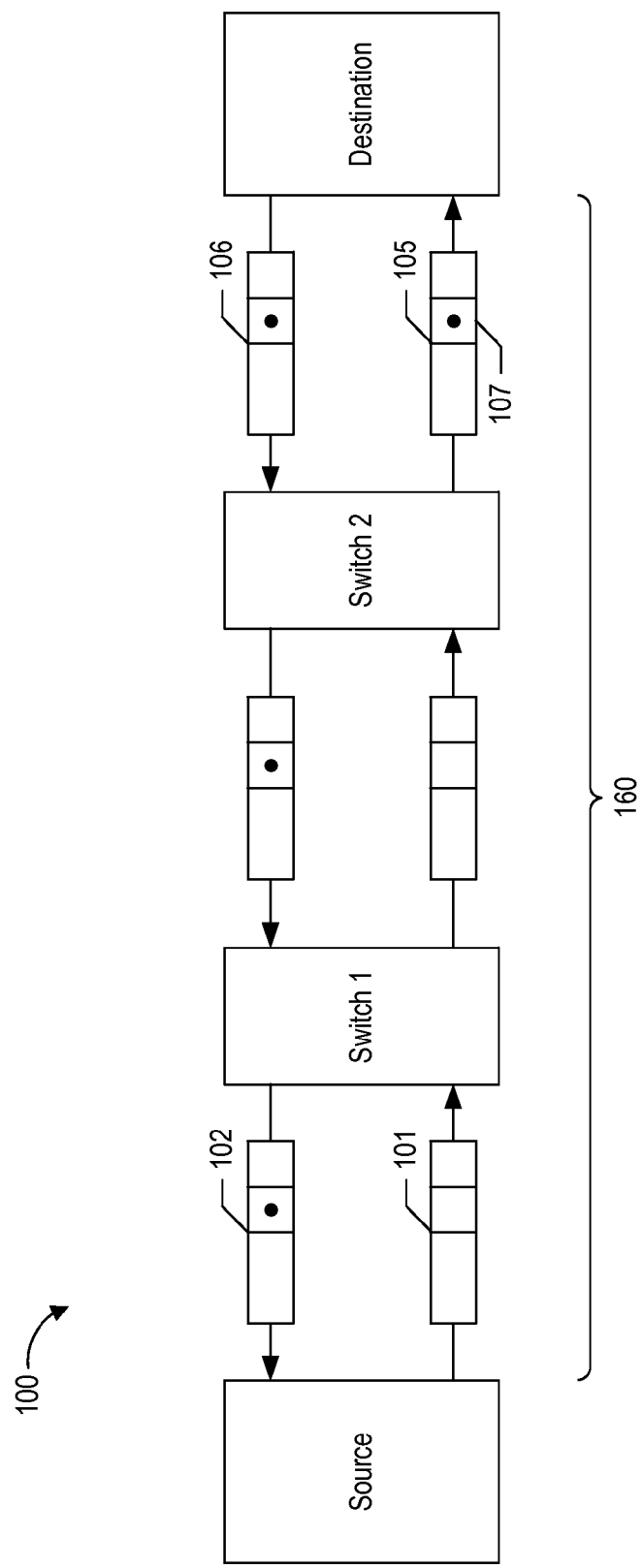
FIG. 1 illustrates a communications network.

In accordance with common practice various features shown in the drawings may not be drawn to scale, as the dimensions of various features may be arbitrarily expanded or reduced for clarity. Moreover, the drawings may not depict all of the aspects and/or variants of a given system, method or device admitted by the specification. Finally, like reference numerals are used to denote like features throughout the specification and figures.

DESCRIPTION OF EXAMPLE EMBODIMENTS

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.
Overview Certain embodiments disclosed herein provide a process of managing congestion in a computer network including forwarding a flow over a first path of a computer network, the first path communicatively connecting a source device and a destination device through a plurality of switching devices. The process may further include detecting congestion in the first path, providing an indication of the congestion, directly or indirectly, to the destination device, and determining a rebalancing switch of the plurality of switching devices based at least in part on a control message generated in response to an instruction received, either directly or indirectly, from the source device. Such process may be performed by a controller of a computing device that is part of the computer network.

Certain embodiments disclosed herein provide a process of managing congestion in a computer network including receiving congestion window data associated with a first path of a computer network from a virtual server that is part of the computer network. The process may further include determining whether the congestion window data indicates that a congestion window associated with the virtual server has been reduced at a rate greater than a predetermined threshold. When it is determined that the congestion window has been reduced at a rate greater than the predetermined threshold, the process may include instructing a switching device of the computer network to generate a control message indicating that a flow is to be rebalanced. Such process may be performed by a computing device that is a part of the computer network.
Congestion in Computer Networks Communication networks, including Local Area Networks (LANs), the public Internet, cloud computing/storage networks, and the like, are often bandwidth-limited. Thus, data sent from a sender to a receiver in a given communication network may experience delay (or may even be lost) as a link between the sender and receiver reaches its maximum throughput capability. In a network storage environment, such as a Mass Storage Device Class (MSDC) environment, data sent over a network link to a storage device or host may be subject to maximum throughput limits and may experience performance degradation as maximum throughput is reached or exceeded. Heavy use of a network leading to delay and/or packet loss may be referred to as network congestion.

Network congestion may be managed by adjusting congestion windows, thereby decreasing the amount of data that is transmitted over a congested path. For example, congestion windows may be adjusted based on instantaneous values of queue lengths of switches. However, such implementations may not take into consideration network utilization. If a specific path gets congested, such path is often still relied on going forward because path allocation is often based on static hashing of flow information; the path is not changed dynamically. Certain embodiments disclosed herein provide congestion management solutions encompassing both switch-based flow rebalancing as well as TCP congestion avoidance at the source. Systems and methods embodying such functionality may help in attaining optimal TCP performance. Principles discussed herein may provide improved ECMP load balancing effectiveness for TCP flows, which can provide value in data center environments.

In TCP-heavy environments, such as data centers, data center TCP (DCTCP), which is a TCP-based protocol designed to meet demands of data center networks, may be desirable. In DCTCP, multiple-bit ECN-based feedback is used to help a sender adjust to congestion. Thus, the sender need not necessarily reduce its window size by half (as suggested by the TCP mechanism), but can start reducing its congestion window gradually at the first signs of congestion.

In addition, or as an alternative, to congestion window reduction, available ECMP paths may be used to dynamically adjust flow routing. Rather than focusing exclusively on TCP congestion avoidance at the source, rehashing flows amongst ECMP paths may provide improved performance.

Congestion Signaling

Certain congestion management solutions provide for congestion signaling, wherein a receiver that is made aware of congestion in the network (either by detecting congestion itself or being informed of the congestion by a network device) sends feedback to the sender to make the sender aware of the network congestion. When the sender receives the feedback that indicates congestion, the sender may, e.g., reduce its sending bit rate to at least partially alleviate the congestion in the network.

Explicit Congestion Notification (ECN), which is an extension of the Transmission Control Protocol (TCP), provides for end-to-end notification of network congestion using a feedback mechanism. FIG. 1 is an illustration of an example system 100 in which ECN may be implemented. For example, as illustrated, a source device or system may be communicatively coupled to a destination device or system through a network 160. The network 160 may include, for example, a local area network (LAN), wide area network (WAN), the Internet, a Fibre Channel fabric, or any combination of such network interconnects. Each of the source and destination devices may include one or more of, for example, a personal computer (PC), server computer, storage server, workstation, handheld computing/communication device or tablet, and/or the like. Although FIG. 1 shows single source and destination devices, the system 100 may include any desirable or practical number of source and/or destination devices.

Transmission between the source and the destination traverses a network 160 including first and second switches/routers. Switch 1 and/or switch 2 may include computer readable code, which when executed, causes the switches to perform according to one or more of the flow diagrams of FIGS. 3-4, which are described below. Switches in the network 100 may comprise physical boxes, or may be software applications configured to interact with a virtual hypervisor in a virtualized computing environment. For example, the network 100 may comprise one or more virtual servers having connections to a physical switch and including certain switch-like capabilities, such as multiple VLANs per virtual interface, layer-3 options, security features, etc. Although only two switches are illustrated, the network may include any desirable or practical number of switches. The network topology may be configured in any suitable manner, and may depend on system parameters or preferences.

As shown, switch 1 receives a packet 101 from the source containing raw data and metadata associated with the raw data. The ultimate destination for the data is the destination device. In order to direct the data on a path to the destination, switch 1 passes the data on to switch 2. In certain embodiments, one or more of switches 1 and 2 is configured as an ECN-aware switch, wherein the switch is configured to set a mark in the packet header in order to signal impending congestion to downstream devices. For example, if switch 2 experiences congestion, it may insert a specific code 107 into an IP header in the packet 105 destined for the destination device. In certain embodiments, one bit in the packet is set to indicate congestion along the path. When the destination device receives the packet 105, it detects the congestion indication and sends a feedback packet 106 (e.g., TCP packet) further indicating the congestion.

The feedback packet ultimately arrives at the source device. Upon receipt of the feedback message, the source may take some action to alleviate the congestion, such as reducing a bit rate by, for example, 50%. In certain embodiments, a congestion window (cwnd) parameter is maintained by the source that, for example, determines the number of bytes that can be outstanding at a given time. The source may reduce its congestion window based on the single-bit (or multi-bit with respect to DCTCP, as described in detail below) congestion indication. For example, the congestion window may be reduced as follows:

$$cwnd \leftarrow cwnd \times (1-\alpha/2) \qquad (1)$$

In a single-bit embodiment, $\alpha$ may be set to a value of 1, for example. Congestion window reduction may be performed according to TCP protocol separately from one or more of the other steps of the process 300. With respect to multi-bit embodiments comprising additional data related to congestion severity, calculation of alpha may be based on the amount of congestion indicated in the received packed. Such congestion window modification is a means by which the source may substantially instantaneously react to congestion introduced in the network. The source device may also set a Congestion Window Reduced (CWR) flag in an IP packet to indicate to the destination device to stop marking the congestion flag in the feedback packets.

Certain embodiments disclosed herein may be particularly applicable in data center network applications. A data center environment may host relatively diverse applications, wherein workloads requiring small, predictable latency are mixed with others requiring large sustained throughput. Data Center TCP (DCTCP) is a TCP-like protocol designed for data center networks to address data center network demands. Whereas the standard TCP congestion control algorithm generally detects the presence of congestion, DCTCP, using an ECN-based feedback mechanism, may provide multi-bit information indicating the extent of congestion as well.

In data centers, TCP may represent a commonly used transport layer protocol (e.g., more than approximately 99% of flows in certain networks). As an example, data centers may host MapReduce (partition-aggregation) applications, as well as other data-intensive applications. Such applications may require relatively strict latency considerations (e.g., of the order of approximately 10 ms, or less). Therefore, data center applications can be sensitive to buffer buildup, which can cause processing delays of critical application packets.

Network Rebalancing

In certain MSDC environments, equal-cost multi-path (ECMP) routing is used for traffic forwarding purposes. ECMP provides a routing scheme where packet forwarding between source and destination nodes can occur over multiple "best paths," which are equally suitable paths according to routing metric calculations. ECMP can potentially offer increases in bandwidth by load-balancing traffic over multiple paths. In certain embodiments, routing involves the assignment of flows to paths by hashing flow-related data in the packet header; packets from a particular network flow are sent down a single deterministic path, while multiple flows are balanced over multiple paths to provide load balancing. In certain embodiments, flows are assigned to an ECMP path at the time of flow creation.

In ECMP, the static mapping of flows to paths may not account for either current network utilization or flow size, wherein resulting hash collisions may overwhelm switch buffers and de-grade overall switch utilization. Certain embodiments disclosed herein provide an end-to-end solution where the source server can contact upstream switches.

Figure 2:
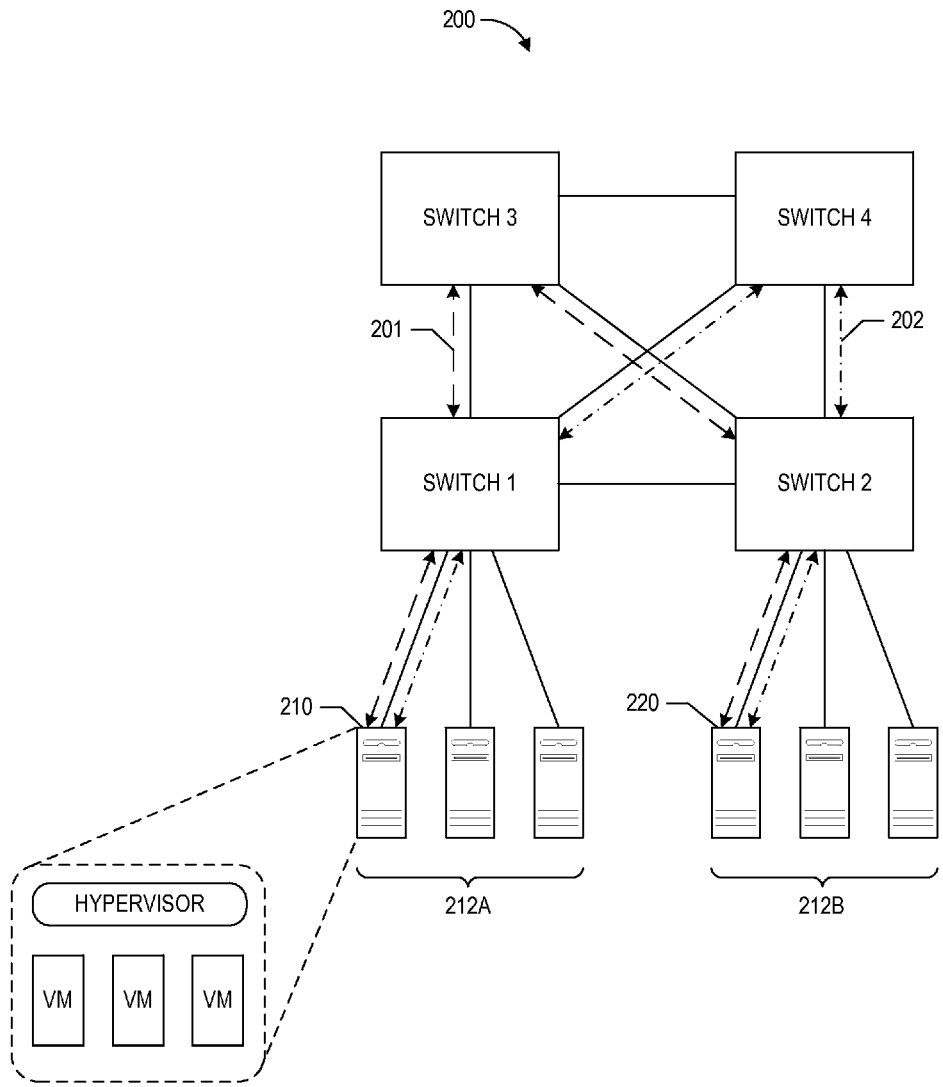
FIG. 2 illustrates a communications network.

FIG. 2 illustrates a communications network 200 including one or more source 212A and destination 212B servers configured to communicate over the network 200. Communications between source and destination servers may traverse a network of one or more switches/routers configured to forward communication packets according to a routing scheme. FIG. 2 illustrates an example in which data is to be sent between a source server 210 and a destination server 220. Two equally-suitable paths between the source 210 and the destination 220 are illustrated (201, 202), according to an ECMP scheme. In certain embodiments, one of the two equal-cost paths may be selected for transmission of a particular flow according to a hash table calculation based at least in part on various flow-specific parameters. For example, a hash value may be based on one or more of the following parameters: source MAC, destination MAC, source IP, destination IP, port ID, and the like. The hash value may be used to select a path from among the equal-cost paths. When the packet arrives at a switch, the hash value is tied to one of the paths.

Although FIG. 2 illustrates only two ECMP paths, certain embodiments may allow for up to 16 multiple paths, for example. When a flow or connection is established between the source 210 and the destination 220, the flow may become tied to a path. In certain implementations, path allocation is performed statically when there is a packet to be sent, with no provision for dynamic reassignment in the future. Therefore, if the assigned path becomes congested, the flow continues to be transmitted over the congested path.

In certain embodiments, one or more source and/or destination servers are virtual machines. For example, a physical server may host one or more virtual servers. The physical server may further include a hypervisor, which may comprise an operating system configured to manage virtual machines running on the server. For example, the hypervisor may coordinate the allocation of physical server resources to the various virtual machines.

Figure 3:
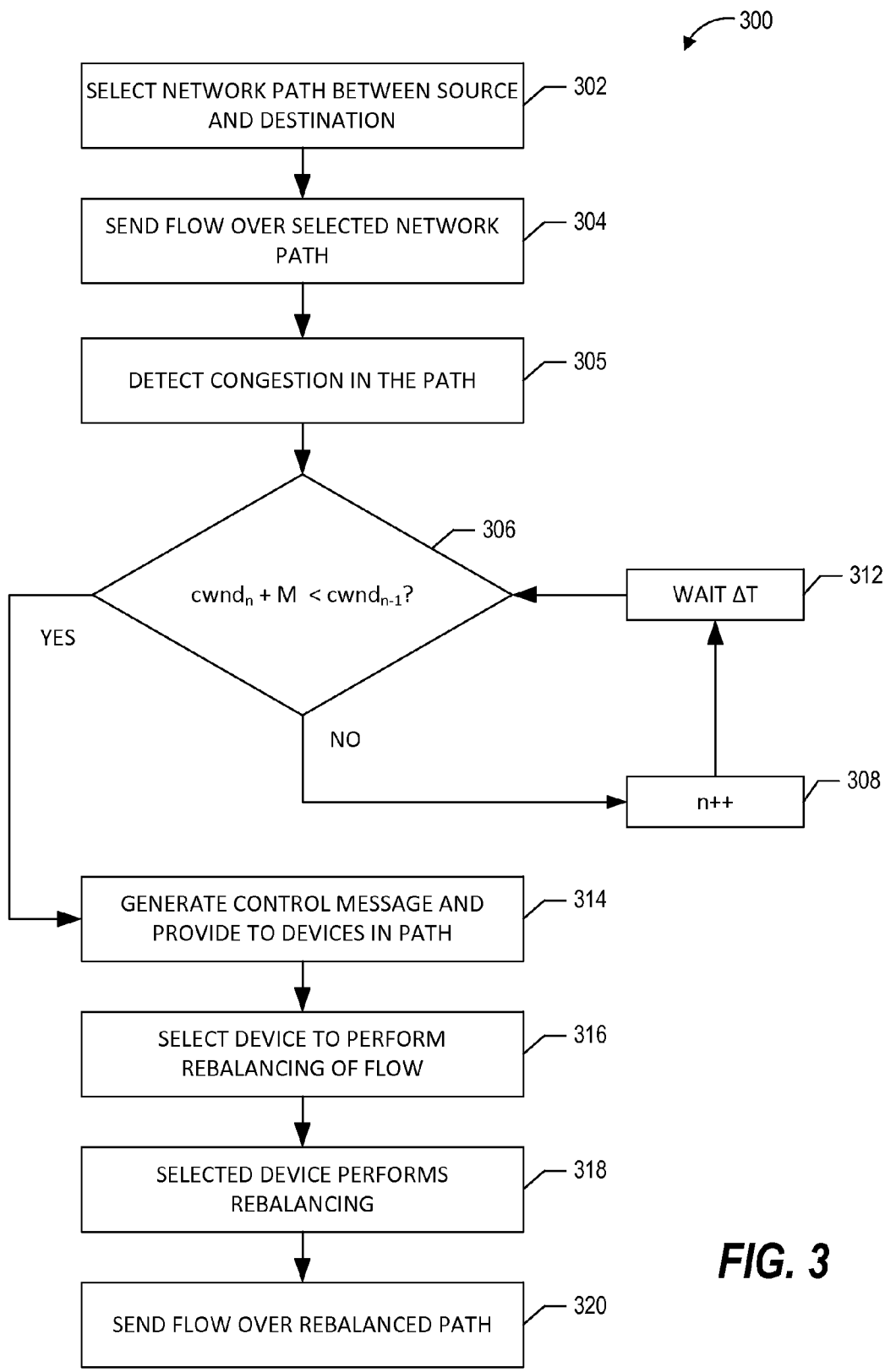
FIG. 3 illustrates a flow diagram for a process for managing congestion in a computer network.

FIG. 3 illustrates a flow diagram for a process for managing congestion in a computer network. For example, the process 300 may be implemented in a data center network, and may be performed by one or more switches and/or servers of the network switches and/or servers. The network may be configured to sustain a variety of in-progress network flows simultaneously, wherein many of such flows are relatively short-lived and do not consume substantial bandwidth. In certain embodiments, the process 300 may be performed in connection with an ECN-based congestion notification scheme, wherein network switches are configured to mark one or more ECN bits in TCP package headers when the package queue length associated with the switch is greater than a predetermined threshold, K.

The process 300 involves sending a flow comprising one or more packets of data over a communications network. At block 302, a communication path between a source device and a destination device is selected. For example, the network may utilize an ECMP scheme, wherein multiple equal-cost paths are available for transmission of the flow. Therefore, selecting the path may involve selecting one from among a plurality of available paths. The selection of what path to use may be based at least in part on one or more parameters associated with the flow, as described above. For example, a hash table may be utilized to associate flows having various flow-identifying characteristics with one of the available paths. Data is then sent in packets over the selected network path (304).

At block 306, a current congestion window (cwnd) associated with the source device is referenced to determine a difference between a previously-read cwnd value and the current cwnd value. In certain embodiments, if the difference between the current congestion window ($cwnd_n$) and the previously referenced congestion window ($cwnd_{n-1}$) exceeds a predetermined threshold, it may be determined that the selected network path is experiencing, or will soon experience, congestion. For example, satisfaction of the following statement may trigger rebalancing:

$$cwnd_n + M < cwnd_{n-1} \qquad (2)$$

wherein $cwnd_n$ represents a current value associated with the congestion window, and $cwnd_{n-1}$ represents a previously received value associated with the congestion window.

If the difference does not exceed the threshold, the process 300 may involve waiting a predetermined period of time, $\Delta T$, and checking again. Therefore, the decision block 306 may determine whether the congestion window has decreased at or above a particular rate. When the congestion window has decreased substantially enough, the flow may be designated for rebalancing.

At block 314, a control message is generated identifying the congested flow and is provided to some or all of the switches in the path. The control message may be generated, for example, by a switch of the path. In certain embodiments, a source server, or hypervisor associated with a virtual source server, may instruct a relatively nearby switch to generate the control message. In certain embodiments, an individual flow can be identified using a flow ID, which may be based, for example, on one or more of source/destination MAC and IP addresses, port ID, and the like.

The control message may be received by all devices that are downstream of the message-generating device. The control message indicates that rebalancing is to be performed by one of the network switches in the path. In order to prevent inconsistency and conflict between switches, it may be necessary or desirable to ensure that only one of the switches performs the rebalancing. Therefore, at block 316, one of the switches is elected to perform rebalancing.

In certain embodiments, in order to ensure that the relevant switches are each aware of the selected rebalancing switch, each of the switches performs the selection independently, based on similar information. For example, the switches may select the rebalancing switch using a hash table or pseudo random number generator. With respect to a random number generator implementation, the seed of the generator may be metadata associated with the congested flow, such as flow ID, and/or other flow parameter(s). When the pseudo random number generator is a deterministic algorithm, using the same seed may guarantee that the random number generated at each switch is the same. For example, if each of the relevant switches generates a random number from 1-to-N (e.g., the number of possible switches), each will generate the same number, J (a number between, e.g., 1 and N). Switch J may then proceed to rebalance the flow(s) (318). Each switch may know the value N, which may be provided by using a control protocol where the source announces the flow ID and/or the value N to all associated switches.

Rebalancing the relevant flow may involve identifying an ECMP path where the specific flow may be reassigned based on, for example, network statistics of ECMP flow. In certain embodiments, an under-utilized ECMP path is identified to reassign the flow to. If this step at block 318 fails and the switch does not find a path, rebalancing may simply be aborted. The process 300 therefore may provide a best effort, wherein a subsequent iteration of rebalancing may identify a better path, based on the above, described randomized mechanism of switch selection. In certain embodiments, the TCP congestion control is not substantially affected by the process 300. Therefore, TCP congestion control may progress as normal, wherein the path selection of process 300 may merely help in congestion avoidance.

Figure 4:
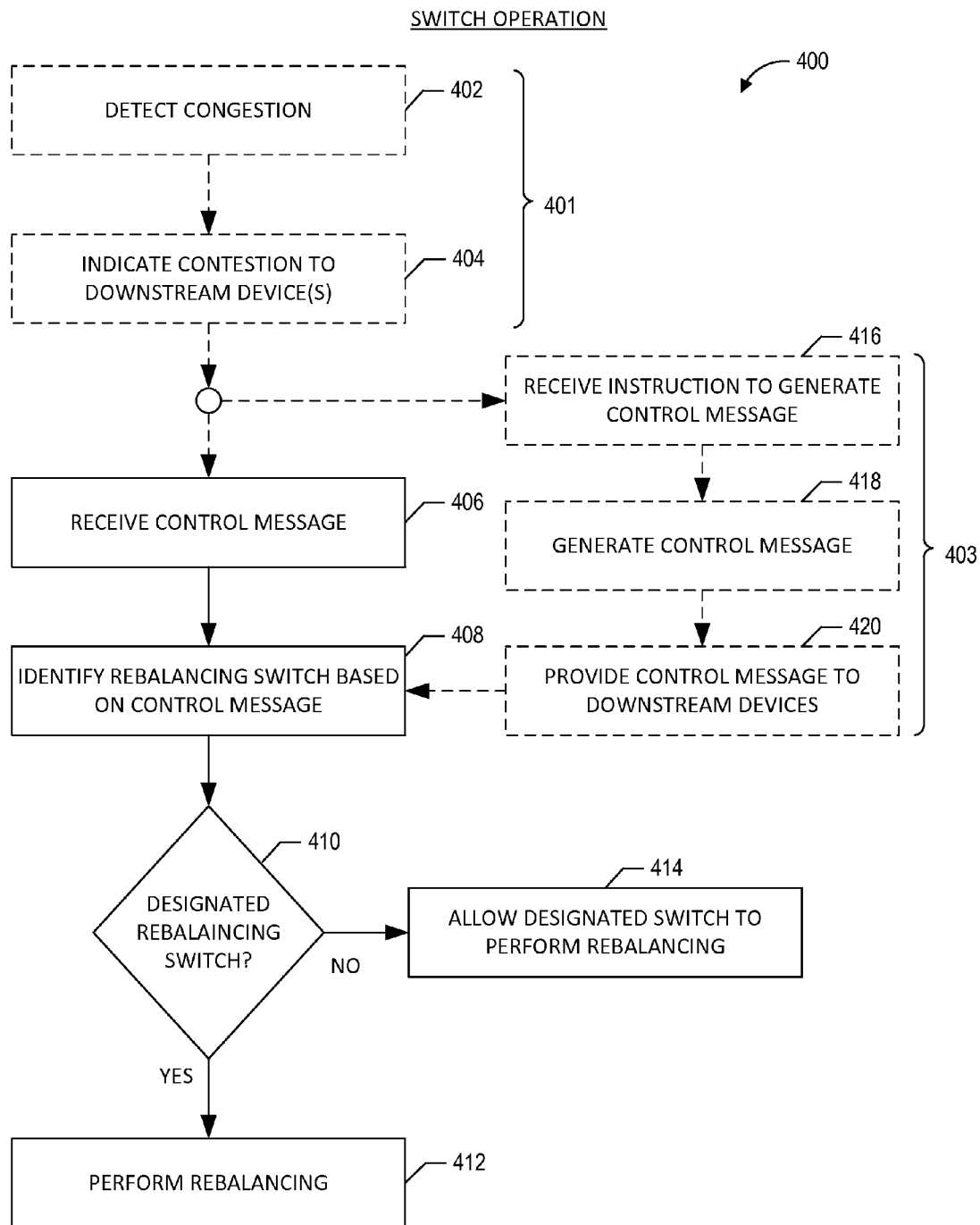
FIG. 4 illustrates a flow diagram for a process for managing congestion by a switching device.

FIG. 4 illustrates a flow diagram for a process for managing congestion by a switching device. The first two steps (401), comprising blocks 402 and 404, may be performed by a switching device that is separate from one or more switching devices configured to perform the remaining steps of the process 400, and are therefore represented by dashed lines, as shown. Blocks 402 and 404 involve detecting congestion along a network path according to ECN, or a variation thereof, and indicating the congestion to one or more downstream devices, including the destination device. For example, congestion indication forwarding may be performed in accordance with TCP or DCTCP protocol, as described above. In certain embodiments, congestion detection and forwarding may be performed by any of the switches disposed in the selected flow path. The steps of the process 400 may be performed by any number of switches, or may be performed substantially by a single switch. In certain embodiments, the steps 401 are performed by a single switch, the steps 403 are performed by a single switch, and the remaining steps 406-412 are performed by a single switch.

In certain embodiments, indication of congestion is provided as feedback to the source device/server. In response to receiving such feedback, a source device/server may instruct a switch associated with the congested flow/path to generate a control message. In certain embodiments, the control message contains flow information and/or information indicating the number, or identification, of switches in the path. The instruction to generate the control message may be provided to any of the switches in the path. In an embodiment, the control message is provided to, and received by, the switch nearest to the source. Steps 416-420, identified by the reference number 403, may be performed by a separate switch from that configured to perform the remaining steps of the process 400. At block 418, the control message is generated by the instructed switch. The switch then provides the control message to the remaining switches in the path, as shown at block 420.

At block 406, the control message is received including flow identification information. Based at least in part on the control message, a switch is selected for performing rebalancing of the congested flow. Switch selection may be performed as outlined above with respect to FIG. 3. Specifically, in certain embodiments, each of the switches in the path may independently generate a random number using a pseudo random number generator based on a seed value associated with flow identification information contained in the control message. When a given switch has determined the balancing switch, if the given switch is the designated rebalancing switch, it proceeds to attempt to rebalance the congested flow. Rebalancing may involve identifying an alternate ECMP path over which to direct the flow. If the given switch is not the designated rebalancing switch, it may simply do nothing and allow the designated switch to perform the rebalancing.

When generating a pseudo random number for selecting the rebalancing switch, any suitable data parameter may be used as the seed, as long as all participating switches use the same seed value. The flow ID may be suitable since it may be known to all participating switches (ECMP switches are generally configured to use flow ID), and therefore additional data need not be transmitted to the switches for this purpose. Furthermore, the flow ID may be relatively unique, thereby increasing the randomization of balancing switch selection from flow to flow.

At blocks 412, 414, the rebalancing is performed. The rebalancing scheme of FIG. 4 may aid the TCP congestion control mechanism by identifying more under-utilized paths and preventing the congestion window from being over adjusted. Such congestion window savings can help maintain the throughput of the flow in the presence of congestion, or the threat of congestion.

Figure 5:
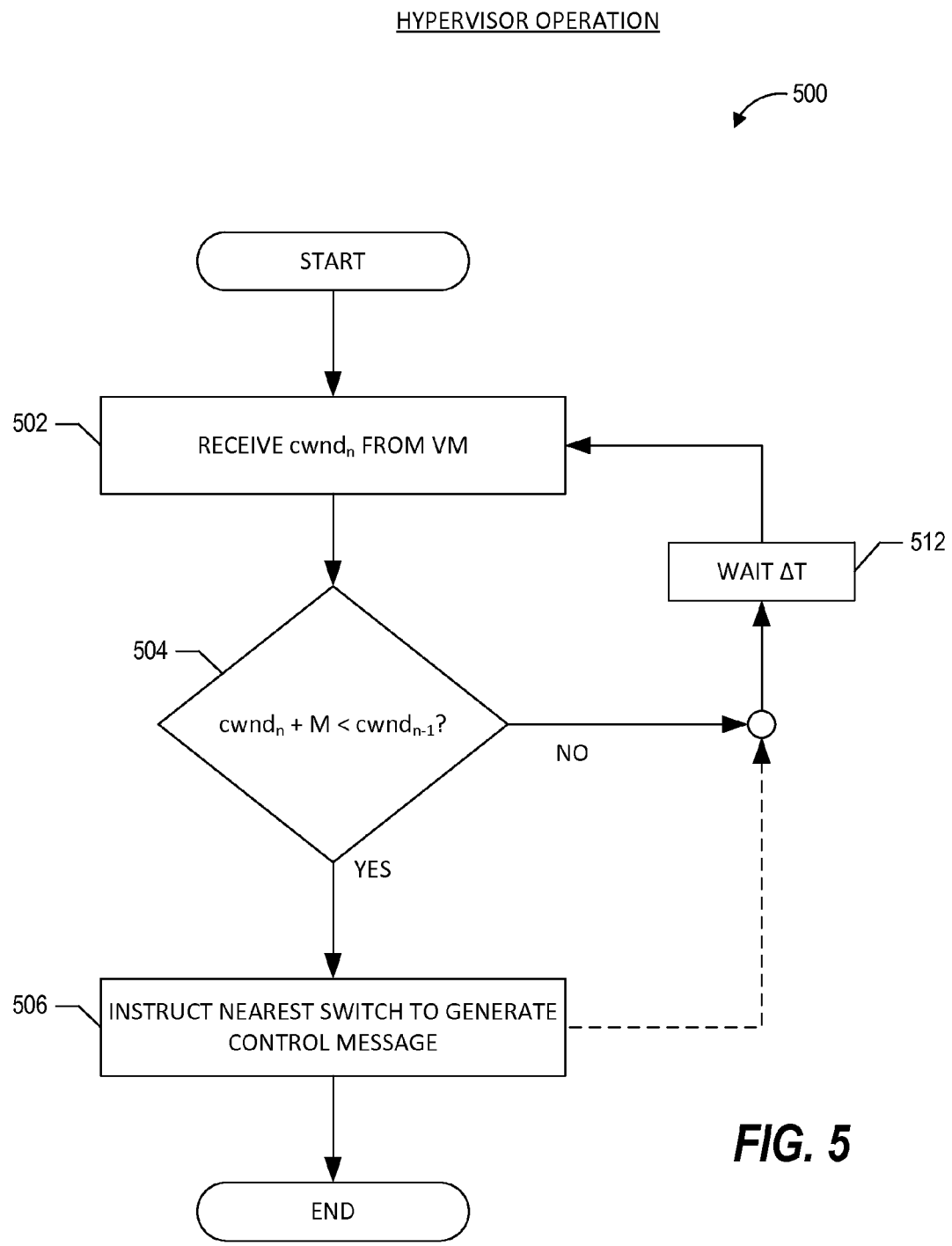
FIG. 5 illustrates a flow diagram for a process for managing congestion by a hypervisor of a virtual server.

FIG. 5 illustrates a flow diagram for a process 500 for managing congestion by a hypervisor of a virtual server. As discussed above, TCP sources in data centers may comprise virtual machines. In certain embodiments, the hypervisor hosting each virtual machine has access to certain information regarding the TCP flows of the virtual machines. For example, in certain embodiments, the virtual machines export out certain TCP parameters, such as the congestion window value, for the hypervisor to read. As shown, at block 502, the process 500 involves a hypervisor receiving the congestion window from a certain virtual machine.

At decision block 504, the hypervisor determines whether the congestion window has changed at a high enough rate to indicate that the respective flow is a candidate for rebalancing. If so, the process 500 involves designating the flow for rebalancing and instructing the nearest switch (or some other switch) in the path to generate a control a control message for the downstream switches, as described above. The hypervisor and/or switches may utilize any suitable switch-based control protocol that already provides link status, and include a tag along such message. In certain embodiments, the hypervisor can simply communicate directly with the nearest switch to announce that the flow ID has a congestion problem.

The hypervisor may read the congestion window (cwnd) value periodically, as indicated at block 512. The value of $\Delta T$ may correspond to any suitable or desirable period of time. In certain embodiments, after the hypervisor instructs a switch to generate a control message, it continues to monitor the congestion window of the virtual machine every $\Delta T$, as indicated by the dashed line in FIG. 5. In certain embodiments, one or more steps of the process 500 are performed by a switching device of the network.

OTHER EMBODIMENTS

Certain embodiments disclosed herein provide for dynamic rehashing of network flows to alleviate congestion in data center environments. Principles and functionality described in the present disclosure may be implemented by virtualization and networking stacks, server controllers, routing and switching device controllers, or any other component or module associated with a computer network. Certain disclosed functionality may be embodied in one or more software applications, such as, for example, software packages for switching devices, virtual servers, or other network devices/modules. Certain systems and methods disclosed herein may be utilized alongside conventional TCP congestion management mechanisms, wherein embodiments disclosed herein bolster congestion management by dynamically modifying network flow paths.

Those skilled in the art will appreciate that in some embodiments, other types of data storage systems and/or programming schemes can be implemented. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method comprising:
by a first switch including a non-transitory memory:
detecting congestion in a first path between a source device and a destination device, wherein the first path comprises a plurality of switches including the first switch;
forwarding an indication of the congestion in the first path to the destination device;
receiving a coordinated control message indicating that one or more data flows associated with the first path are designated for rebalancing, wherein the coordinated control message is received by at least two of the plurality of switches; and
selecting a respective switch from among the plurality of switches to rebalance the one or more data flows associated with the first path in response to receiving the coordinated control message, wherein a second switch of the plurality switches also selects the respective switch from among the plurality of switches.

2. The method of claim 1, further comprising:
performing a rebalancing of the one or more data flows associated with the first path according to a determination that the respective switch selected from among the plurality of switches is the first switch.

3. The method of claim 2, wherein performing the rebalancing comprises selecting a second path between the source and destination devices, wherein the first path and the second path are Equal-Cost Multi-Path (ECMP) paths.

4. The method of claim 2, wherein only the first switch from among the plurality of switches performs the rebalancing of the one or more data flows associated with the first path.

5. The method of claim 1, further comprising:
foregoing rebalancing of the one or more flows associated with the first path according to a determination that the respective switch selected from among the plurality of switches is not the first switch.

6. The method of claim 1, wherein the control message comprises flow identification information associated with at least one of the one or more flows associated with the first path.

7. The method of claim 1, wherein the control message comprises selection metadata for selecting a respective switch from among the plurality of switches to perform the rebalancing.

8. The method of claim 7, wherein the respective switch is selected from among the plurality of switches based at least in part on the selection metadata.

9. The method of claim 8, wherein the selection metadata includes at least one of a hash table or a seed value.

10. The method of claim 9, wherein selecting the respective switch from among the plurality of switches comprises generating a pseudo random number based on the seed value.

11. A method comprising:
by a first switch including a non-transitory memory:
detecting congestion in a first path between a source device and a destination device, wherein the first path comprises a plurality of switches including the first switch;
forwarding an indication of the congestion in the first path to the destination device;
receiving an instruction from the destination device to generate a coordinated control message in response to the indication of congestion in the first path;
forwarding the coordinated control message to at least two of the plurality of switches; and
selecting a respective switch from among the plurality of switches to rebalance the one or more data flows associated with the first path in response to receiving the coordinated control message, wherein a second switch of the plurality switches also selects the respective switch from among the plurality of switches.

12. The method of claim 11, further comprising:
performing a rebalancing of the one or more data flows associated with the first path according to a determination that the respective switch selected from among the plurality of switches is the first switch.

13. The method of claim 11, further comprising
foregoing rebalancing of the one or more flows associated with the first path according to a determination that the respective switch selected from among the plurality of switches is not the first switch.

14. A method comprising:
by a controller including a non-transitory memory:
receiving congestion window data associated with a first path of a network from a virtual server that is part of the network, wherein the first path comprises a plurality of switches;
determining whether the congestion window data indicates that a congestion window associated with the virtual server has been reduced at a rate greater than a predetermined threshold;
instructing a switch of the network to generate a control message indicating when it is determined that the congestion window has been reduced at a rate greater than the predetermined threshold, wherein the switch forwards the control message to at least two of the plurality of switches; and
selecting a respective switch from among the plurality of switches to rebalance the one or more data flows associated with the first path in response to receiving the coordinated control message, wherein a second switch of the plurality switches also selects the respective switch from among the plurality of switches.

15. The method of claim 14, further comprising:
when it is determined that the congestion window has not been reduced at a rate greater than the predetermined threshold, waiting a predetermined period of time; and
after waiting the predetermined period of time, receiving updated congestion window data.

16. The method of claim 14, wherein the congestion window data comprises multiple bits of information indicating a degree of congestion of the first path.

17. The method of claim 14, wherein the controller is a hypervisor associated with the virtual server.

18. The method of claim 14, wherein determining whether the congestion window data indicates that the congestion window has been reduced at a rate greater than the predetermined threshold comprises comparing a previous value associated with the congestion window with the congestion window data to determine whether the difference between the previous value and a value associated with the congestion window data is greater than a predetermined value.

19. The method of claim 14, wherein the switch is a nearest switch from among the plurality of switches of the first path.

20. The method of claim 14, wherein the congestion window indicates bytes-per-second transmitted by the virtual server over the first path.

* * * * *